June 20, 1939.  J. D. SCHMIEG  2,163,452
APPARATUS FOR REMOVING FOREIGN MATERIAL FROM AIR
Filed Nov. 11, 1937  2 Sheets-Sheet 1

INVENTOR
John D. Schmieg.
BY Harness, Dickey & Pierce.
ATTORNEYS.

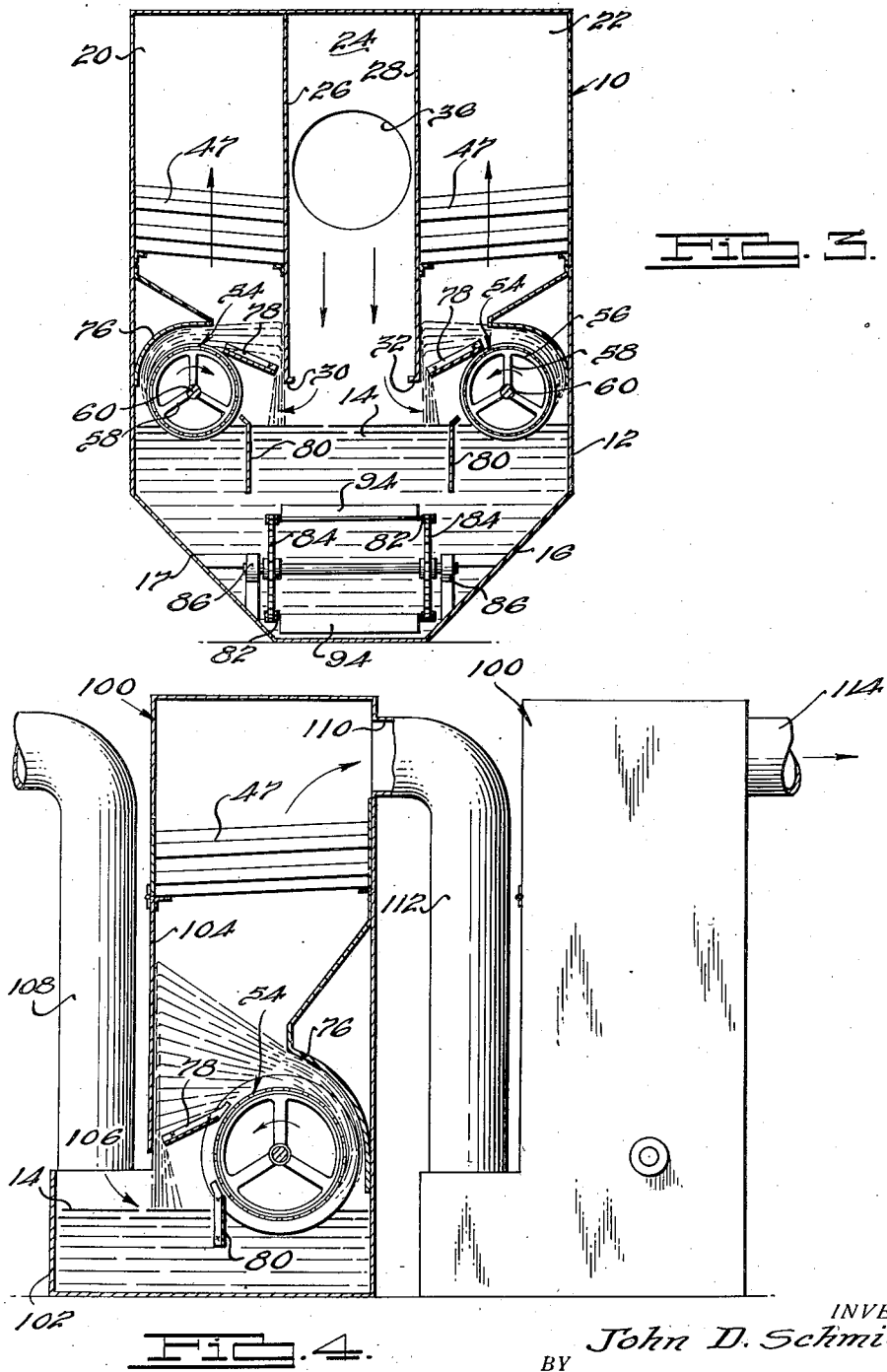

Patented June 20, 1939

2,163,452

UNITED STATES PATENT OFFICE 2,163,452

APPARATUS FOR REMOVING FOREIGN MATERIAL FROM AIR

John D. Schmieg, Detroit, Mich., assignor to Schmieg Sheet Metal Works, Detroit, Mich.

Application November 11, 1937, Serial No. 173,961

5 Claims. (Cl. 261—92)

This invention relates to an improved method of and apparatus for removing foreign material, such as dust, paint, lacquer, enamel, or the like, from air.

The main object of the present invention is to provide an improved structure by which air laden with foreign material in suspension is effectively cleaned by arresting and removing the foreign material from the air.

Another object of the present invention is to provide an apparatus of the type mentioned of such a construction that the air laden with foreign material is caused to change the direction of its course a number of times, which change in directional movement assists in the removal of the foreign material from the air.

A further object of the present invention is to provide a structure which utilizes a liquid for removing the foreign material from the air and in which the liquid may be re-circulated for use and kept clean by associating with the apparatus a mechanism for removing the foreign material from the re-circulated liquid.

A more specific object of the present invention is to provide a conveyor for removing foreign material from the liquid bath which is re-circulated and used for removing the foreign material from air.

Another object of the present invention is to provide a mechanism for automatically maintaining a predetermined level of a liquid bath within which a rotatable member extends to a predetermined depth, so that a moving mass of liquid, created by rotation of the rotatable member, will be of proper character to effectively remove foreign material from air passed through the moving mass of liquid.

Other objects of the present invention will become apparent from the following specification, the drawings relating thereto, and from the claims hereinafter set forth.

In the drawings, in which like numerals are used to designate like parts in the several views throughout:

Fig. 3 is a cross-sectional view taken substantially along the line 3—3 of Fig. 1; and Fig. 4 is a modified arrangement of applicant's structure.

The present invention relates in general to an apparatus such as that described and claimed in the co-pending application of John D. Schmieg, Serial No. 136,237, filed April 12, 1937. The present invention has particular utility in removing solid materials, particularly solid materials heavier than water, in suspension in air from the air; and the embodiment of the invention illustrated in the Figs. 1 to 3 of the drawings is particularly adaptable for the removal of such heavy solids from air. It is to be understood, however, that the apparatus described has also general utility for removing foreign material such as acid fumes, dust, sand, fly-ash, paint, and the like, from air in which the foreign material is held in suspension.

Figure 1:
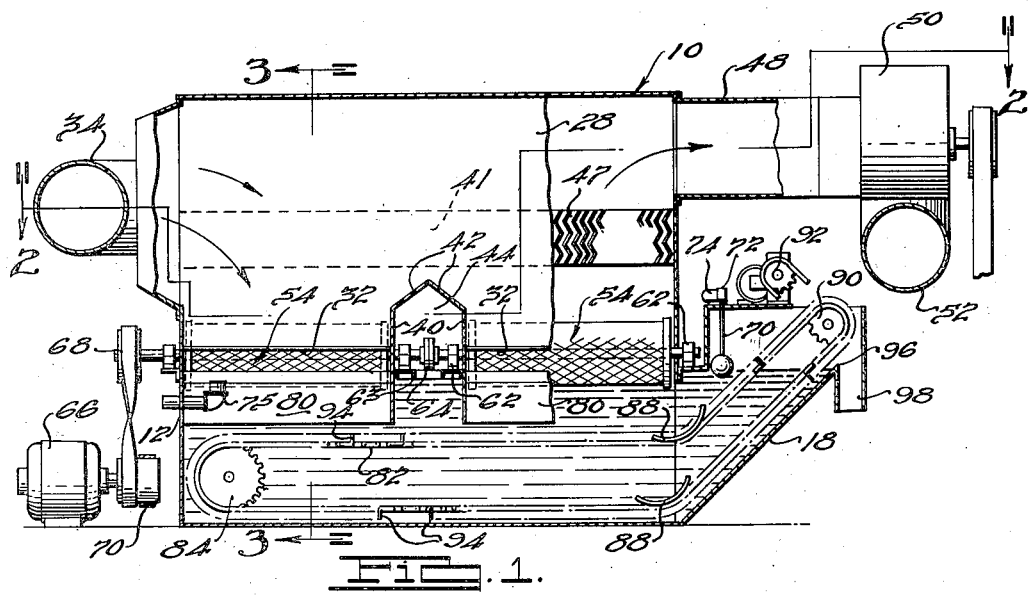
Figure 1 is a front, vertical cross-sectional view, showing parts in elevation, of an apparatus illustrating an embodiment of the present invention.
Figure 2:
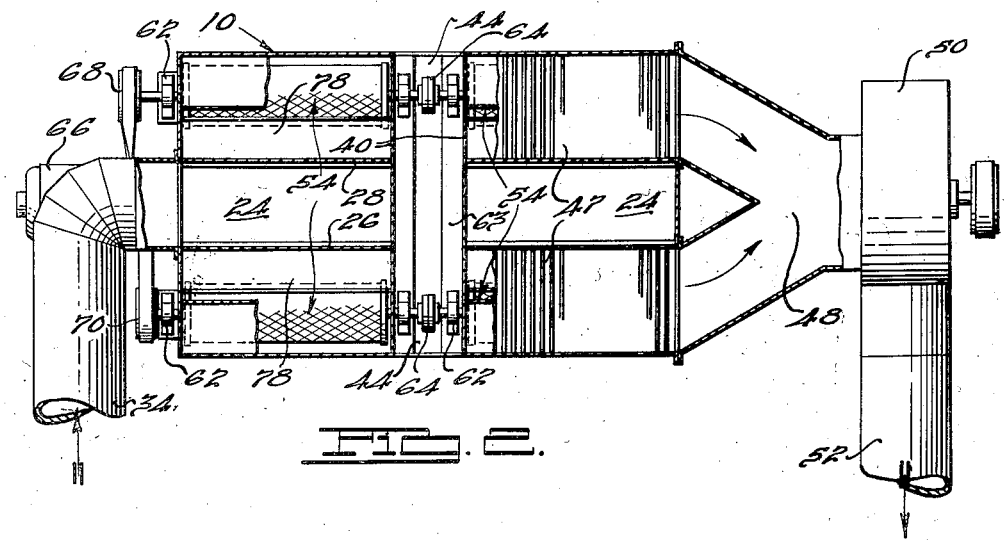
Fig. 2 is a cross-sectional view, with parts in elevation, taken substantially along the line 2—2 of Fig. 1.

Referring to the drawings, and referring particularly to Figs. 1 to 3, an embodiment of the invention is illustrated which includes a housing or cabinet generally indicated at 10. The housing 10 is preferably formed of sheet metal material and the side, end, and top walls are preferably enclosed so that the space within the housing is substantially enclosed from the outside. The lower portion 12 of the housing provides a receptacle for a bath of liquid, such as water 14. The longitudinal side walls 16 and 17 of the lower portion 12 are preferably sloped inwardly so as to provide a trough-like structure. One of the end walls 18 of the bottom portion 12 is also sloped upwardly for a purpose that will hereinafter be described in detail.

Water is the preferred and usual liquid used within the receptacle to provide the bath; but other liquids are also capable of use with the present invention, such as oil, caustics, and acids, or the like, and the reference to water is to be considered as illustrative only.

The interior of the housing 10 is divided into side compartments 20 and 22 and a central compartment 24 by longitudinally extending wall members 26 and 28 which extend for substantially the length of the cabinet 10. The wall members 26 and 28 terminate above the normal level of the bath 14 and in spaced relation thereto to provide air inlet openings 30 and 32, respectively.

An air inlet conduit member 34 communicates through an opening 36 in one of the end walls of the housing 10 with the central compartment 14. The air laden with foreign material is thus passed through the conduit 34 into the central chamber 24 through the opening 36. While in the embodiment illustrated, the inlet is provided in one of the end walls, it is to be understood that the inlet may be provided in the top wall of the housing 10 in communication with the central chamber 24 within the scope of the present invention. The central chamber 24 thus provides a downwardly extending air inlet conduit through which the air laden with foreign material is caused to pass in its passage through the inlet openings 30 and 32 into the side compartments 20 and 22, respectively.

The lower portions of the side compartments 20 and 22 are each divided into a pair of chambers in the embodiment illustrated by means of transversely extending wall members 40 and 41. Top members 42 connect the wall members 40 and 41 and thus provide spaces 44 within which parts of the operating mechanism, to be hereinafter described, are located.

The upper portions of the side compartments 20 and 22 form continuous exhaust conduits which communicate with the lower portions of the side compartments and through which the cleaned air is exhausted to the outside. The exhaust conduits are preferably provided with vertically extending zig-zag baffles 47 at spaced intervals across the exhaust conduit for rapidly changing the direction of travel of the exhausted air and removing any moisture which may have been included in the air carried into the exhaust conduit. A Y-shaped conduit member 48 communicates with the side chambers 20 and 22 and has associated therewith a blower 50 of conventional construction for exhausting the air from the exhaust conduit and for forcing the cleaned aid through a return conduit 52 from which the air may be returned to the room or space within which the unit is mounted. The blower 50 is driven by a suitable, variable speed driving mechanism, not shown, so that the rate at which the air is passed through the unit may be controlled.

In order to create a moving mass of liquid having the desired characteristics through which the air laden with foreign material is passed, thereby cleaning the air and removing the foreign material therefrom, rotatable, hollow, substantially cylindrical members 54 are mounted within the side compartments 20 and 22, in the embodiment illustrated there being two of such members mounted within each side compartment, or one in each of the chambers referred to above. The members 54 are mounted within the lower portion of the cabinet 10 so that portions of the members 54 extend downwardly below the normal level of the bath a predetermined distance. The members 54 are preferably similar to those disclosed in the patent to John D. Schmieg, No. 2,066,913, granted January 5, 1937. Each of the members 54 comprises a substantially cylindrical hollow portion 56 which is preferably formed of expanded metal. The cylindrical portion 56 is mounted on pulleys 58, one pulley being provided at each end of the cylindrical portions 52 and the pulleys being suitably secured to the inner surface of the portion 52 adjacent its ends. Each of the rotatable members 54 is mounted within its respective side chamber by means of a shaft 60 which is preferably arranged substantially horizontally. The shafts 60 extend through the end walls of the housing and also extend through the partitioning walls 50 to the spaces indicated at 44. Suitable bearings 62 are provided adjacent the ends of the shafts for mounting the outer ends of the shaft. A transversely extending support 63 is mounted within the space 44 and supports the bearing 62 mounted within this space. The shafts 60 are suitably secured to the pulleys 58 so that, upon rotation of the shafts, the rotatable members 54 are rotated to create the proper moving mass of liquid through which the air is passed.

The ends of the shafts 60 extending within the space 44 are connected together by means of suitable couplings 64 so that the pairs of rotatable members 54 within their respective side compartments are rotated as a unit. All of the rotatable members 54 are preferably driven by a single variable speed motor 66 which is connected to the ends of the shafts 60 extending through one end of the housing by means of conventional belt end pulley mechanisms 68 and 70. The belt pulley mechanisms are so arranged that the members 54 at the left, viewing Fig. 3, are rotated in a clockwise direction, and the members 54 at the right of Fig. 3 are rotated in a counterclockwise direction.

In order to provide a moving mass of liquid, such as water, of desired characteristics, the liquid 14 within the receptacle 12 is maintained at such a level that the top surface of the liquid extends above the lower edge of the rotatable members 54 as indicated in the drawings. In order to maintain this predetermined level, a vertically adjustable float 71 actuates a valve 72 which in turn serves to supply water through a conduit 74 into the bath for the purpose of raising the level of the bath in the event that it drops below a predetermined level, due to loss mainly caused by vaporization. An overflow pipe 75 is also provided for preventing the liquid in the bath from raising above a predetermined level. This pipe may be vertically adjustable so that the level may be varied for various conditions.

Upon rapid rotation of the cylindrical members 54, a fast moving sheet-like free mass of liquid is created in that portion of the cabinet surrounding the cylindrical members 54. Members 76 are mounted adjacent each of the rotatable members 54 and each form a rear wall portion within the cabinet for substantially the length of the cabinet. A portion of the wall member 76 extends inwardly within the cabinet and extends longitudinally in spaced relation to the peripheral surfaces of the members 54. The moving free mass of liquid created by the rotation of the members 50 are thus guided by the wall portion 76 and thrown forwardly of the receptacle against the wall members 26 and 28 above the inlet openings 30 and 32, respectively.

The operation of the structure so far described is as follows:

Motor 66 is started to cause rotation of the cylindrical members 54 and the blower 50 is operated to create a suction within the cabinet 10. This suction causes air laden with foreign material in suspension to pass into the cabinet and downwardly through the central compartment 24. The surface of the bath is exposed adjacent the bottom of the center compartment 24 and as the air passes downwardly and abruptly changes its course in passing through the inlet openings 30 and 32, a portion of the foreign material carried by the air drops directly down against the surface of the bath within which it is fixed. Rotation of the cylindrical members 54 in the direction indicated by the arrows in Fig. 3 creates the moving mass of liquid and throws this moving mass of liquid against the wall members 26 and 28 above the inlet openings 30 and 32, respectively. The liquid thrown against the wall members 26 and 28 is caused to drop downwardly forming a substantially continuous sheet of liquid across the inlet openings 30 and 32. Air passing through the inlet openings passes first through the downwardly moving sheet of liquid adjacent the inlet openings and receives a first or preliminary wash when passing through this sheet of liquid. The air then enters the interior of the cylindrical members 50 through the openings in the members, and it is swirled around within the cylinders and then passes upwardly and outwardly through the openings in the rotating members and further passes upwardly through the moving mass of liquid above the rotatable members. The moving mass of water is preferably moved at a higher rate of speed than the speed of the air passed therethrough and as the air is passed transversely of the direction of movement of the moving mass of water, any foreign material carried by the air is forcibly removed therefrom, and the air is passed out through the exhaust conduit in a cleaned condition. The foreign material removed from the air is caused to drop downwardly to the bath 14 from which it is removed in a manner to be hereinafter described.

Elongated baffle members 78 having flanged ends are mounted within the chambers of the side compartments and are suitably secured to the end walls of the housing 10 and the partitioning walls 40. The baffle members 78 are positioned adjacent the front portions of the rotatable members 54 so as to assist in directing the moving mass of water forwardly and against the wall members 26 and 28. According to certain aspects of the present invention, the air may be passed directly through the moving mass of water without being passed through the hollow cylindrical members, but it is preferable that the air be passed into the interior of the hollow cylindrical member and then outwardly therefrom; and the baffles 78 assist in this purpose.

The liquid within the bath 14 is re-circulated so that the liquid containing the foreign material is discharged back into the bath. So that the liquid adjacent the bottoms of the rotatable members 54 is comparatively clean and in a proper condition for continuously cleaning the air passed through the unit, other longitudinally extending baffle members 80 are mounted within the side compartments 20 and 22, one of such baffles being provided for each of the rotatable members 54. The baffle members 80 may be suitably secured to the end walls of the receptacle and to the partitioning members 40. The baffle members 80 extend downwardly within the bath below the surface thereof and are preferably mounted between the facing edge of each of the rotatable members 54 and its corresponding inlet opening so that the liquid containing the foreign materials is discharged on the side of the baffle opposite to that of its corresponding rotatable member. These baffles serve to prevent the re-entry of any foreign material collected on the surface of the bath and require that water in returning to its position under one of the rotatable members first pass under the baffle. Where materials that are heavier than water are being removed from the air, such materials will drop to the bottom of the bath and settle in the trough at the bottom in the form of a sludge.

In order to remove the sludge collected in the trough at the bottom of the receptacle, a continuous conveyor mechanism is provided which conveys and discharges the sludge from the bath. In the embodiment illustrated, the conveyor mechanism comprises endless chains 82 which extend over sprockets 84 mounted within the bath at one end of the cabinet 10 on suitable bearing supports 86. The chains 82 extend in a substantially horizontal direction above the bottom of the trough; and curved guides 88 engage the chains 82 for maintaining the chains in this position. The opposite ends of the chains extend around drive sprockets 90 which are mounted above the bath and above the inclined wall member 88 so that the chains 82 travel in a path substantially parallel to the inclined wall 18. Suitable driving mechanism 92 is mounted above the inclined wall 18 and is connected to the drive sprocket 90 for rotating the chains 82 in a counter-clockwise direction, viewing Fig. 1. Transversely extending angle members 94 are connected to the chains 82—82 at spaced intervals therealong and form scrapers which engage the sludge collected on the bottom of the receptacle and drag the sludge towards the right of the receptacle, viewed in Fig. 1, and upwardly along the inclined wall 18. The chains 82, sprockets 84, and scraping members 94 are so constructed and arranged that the lower edges of the members 94 on the lower run are disposed a slight distance only away from the floor of the trough and the inclined wall 18. The inclined walls 16 and 17 serve to direct the sludge settling to the bottom of the receptacle towards the bottom of the trough so that substantially all of the sludge will be engaged by the scrapers 94 and be removed from the bath. The sludge is spilled over the edge 96 and dropped downwardly through a conduit 94 where it may be collected and removed. The liquid of the bath is thus kept comparatively free of any of the foreign materials and may be recirculated for continuous use in cleaning the air passed through the unit.

Referring to Fig. 4, a modified arrangement of applicant's structure is illustrated in which units embodying features of applicant's structure are arranged in series, so that the air is passed first through one of the units and then passed through another unit. Such an arrangement is ordinarily not necessary when removing the usual foreign materials from air, but certain types of substances are particularly difficult to remove and the arrangement illustrated in Fig. 4 serves to completely clean the air of such substances. In this structure each of the cabinets 100 is preferably formed of a sheet metal material and is provided with a lower portion 102 which provides a receptacle for a bath of the liquid 14. Each of the cabinets 100 in the embodiment illustrated is similar to the cabinet disclosed and claimed in the co-pending application of John D. Schmieg, Serial No. 136,237 referred to above. The front wall 104 of the cabinet preferably terminates above the normal level of the liquid to provide an air inlet opening 106 through which the air passes in its entry into the cabinet. A downwardly extending air inlet conduit 108 is provided which discharges downwardly against the forwardly extending portion of the bath 14 and which communicates with the opening 106. As in the embodiment of the invention described above, the air carrying the foreign material in suspension is thus caused to travel downwardly and then abruptly change its course in passing through the inlet opening 106.

In the embodiment illustrated in Fig. 4, only one rotating member 54 is provided within each cabinet 100 with its corresponding wall members 76, and baffles 78 and 80. The function and effect of these parts of the mechanism are the same here as described above.

Suitable means are provided for drawing the air into and through the units and the air is passed upwardly and discharged outwardly through an outlet opening 110 into another downwardly directed conduit member 112 which is similar to the conduit 108. Both of the units 100 are similar to each other so that the air discharged from the conduit 112 passes through the second unit 100 and may be discharged therefrom through a suitable conduit 114.

Formal changes may be made in the specific embodiment of the invention described without departing from the scope and substance of the invention, the scope of which is commensurate with the appended claims.

What is claimed is:

1. Apparatus for removing foreign material from air laden with foreign material in suspension, comprising a housing including a receptacle containing a bath of liquid, an elongated rotatable member mounted within said housing longitudinally thereof with a portion of said member extending into said bath, said housing having an upstanding wall portion having an air inlet opening therethrough directed toward the longitudinal surface of said rotatable member with the upper edge of said inlet opening located below the top of said rotatable member, means forming a downwardly directed air inlet conduit adjacent said inlet opening so arranged that the air laden with foreign material in suspension is caused to abruptly change its direction of flow in passing into said housing through said inlet opening, means for rotating said rotatable member to create a moving mass of liquid and to throw the liquid to one side of said housing, and an exhaust conduit communicating with said housing above said mass of liquid and above said inlet opening, and means for drawing air laden with foreign material in suspension downwardly through said inlet conduit, through said inlet opening, through said mass of liquid, and upwardly through said exhaust conduit to remove the foreign material from the air and thereafter exhaust the cleaned air.

2. Apparatus for removing foreign material from air laden with foreign material in suspension comprising a housing including a receptacle containing a bath of liquid, wall members mounted within said housing dividing the interior thereof into a plurality of compartments, one of said compartments defining a downwardly directed air inlet conduit, an elongated rotatable member mounted within another of said compartments longitudinally thereof with a portion of said rotatable member extending into said bath, the wall portion between said compartments having an air inlet opening therethrough above the level of said bath and directed toward the longitudinal surface of said rotatable member, the top of said opening being located below the top of said elongated rotatable member so that the arrangement of said air inlet opening relative to said inlet conduit is such that the air laden with foreign material in suspension is caused to abruptly change its direction of flow in passing into said another of said compartments through said inlet opening, means for rotating said rotatable member to create a moving mass of liquid and to throw the liquid to one side of said last named compartment, an exhaust conduit communicating with said last named compartment above said mass of liquid and above said inlet opening, and means for drawing air laden with foreign material in suspension downwardly through said inlet conduit, through said inlet opening, through said mass of liquid and upwardly through said exhaust conduit to remove the foreign material from the air and thereafter exhaust the cleaned air.

3. Apparatus for removing foreign material from air laden with foreign material in suspension comprising a housing including a receptacle across the bottom thereof containing a bath of liquid, longitudinally extending wall members disposed within said housing in spaced relation to each other dividing said housing transversely thereof into side and center compartments, said wall members having inlet openings therethrough adjacent the level of said bath providing inlet openings into said side compartments above the level of the bath, said center compartment forming a downwardly directed air inlet conduit adjacent said inlet openings so arranged that the air laden with foreign material in suspension is caused to abruptly change its direction of flow in passing into said side compartments through said inlet openings, elongated rotatable members mounted within said side compartments respectively longitudinally thereof with a portion of said members extending into said bath, means for rotating said rotatable members to create moving masses of liquid and to throw the liquid to one side of said side compartments, exhaust conduits communicating with said side compartments above said mass of liquid and above said inlet openings, and means for drawing said air laden with foreign material in suspension downwardly through said center compartment, through said inlet openings, through said masses of liquid and upwardly through said exhaust conduit to remove the foreign material from the air and thereafter exhaust the cleaned air.

4. Apparatus for removing foreign material from air laden with foreign material in suspension comprising, in combination, a housing including a receptacle across the bottom thereof containing a bath of liquid, said housing having a wall portion with an opening therethrough adjacent said bath to provide an air inlet opening above said bath, an elongated rotatable member mounted within said housing longitudinally thereof and with a portion of said member extending into said bath, a longitudinally extending baffle member mounted within said receptacle with the top of said baffle member extending above the normal level of said bath and with the bottom of said baffle member terminating in spaced relation to the bottom of said receptacle so that the liquid within the bath may circulate under said baffle, a continuous conveyor mechanism disposed within said receptacle adjacent the bottom thereof on the side of said baffle opposite to said rotatable member, means for driving said mechanism, means for rotating said rotatable member to create a moving mass of liquid and to throw the liquid over said baffle and above said conveyor into said bath, and means for drawing air laden with foreign material in suspension through said inlet opening, through said mass of liquid, and through said exhaust conduit to remove the foreign material from the air and thereafter exhaust the cleaned air, an exhaust conduit communicating with said receptacle above said mass of liquid and above said inlet opening.

5. Apparatus for removing foreign material from air laden with foreign material in suspension comprising, in combination, a housing including a receptacle across the bottom thereof containing a bath of liquid, said receptacle being trough-like in shape, said housing having a wall portion with an opening therethrough adjacent said bath to provide an air inlet opening above said bath, an elongated, rotatable member mounted within said housing longitudinally thereof and with a portion of said member extending into said bath, a longitudinally extending baffle member mounted within said receptacle with the top of said baffle member extending above the normal level of said bath and with the bottom of said baffle member terminating in spaced relation to the bottom of said receptacle so that the liquid within said bath may circulate under said baffle, a continuous conveyor mechanism disposed within said receptacle adjacent the bottom thereof, means for driving said mechanism, means for rotating said rotatable member to create a moving mass of liquid and to throw the liquid against the wall portion above said inlet opening and return the liquid to said bath on the side of the baffle opposite to that of the rotatable member, an exhaust conduit communicating with said receptacle above said mass of liquid and above said inlet opening, and means for drawing air laden with foreign material in suspension through said inlet opening, through said mass of liquid, and through said exhaust conduit to remove the foreign material from the air and thereafter exhaust the cleaned air.

JOHN D. SCHMIEG.